Aug. 15, 1961 D. M. PUTNAM 2,996,588
FLUID PRESSURE OPERATED ELECTRICAL SWITCH ASSEMBLY
Original Filed Dec. 5, 1958

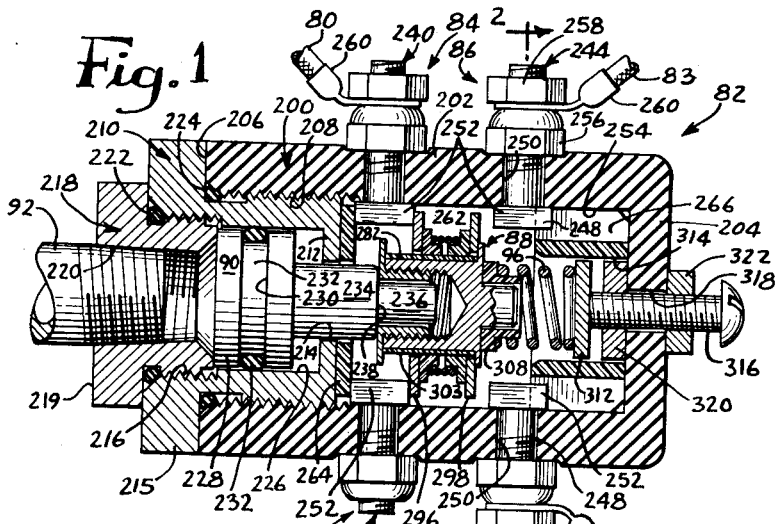
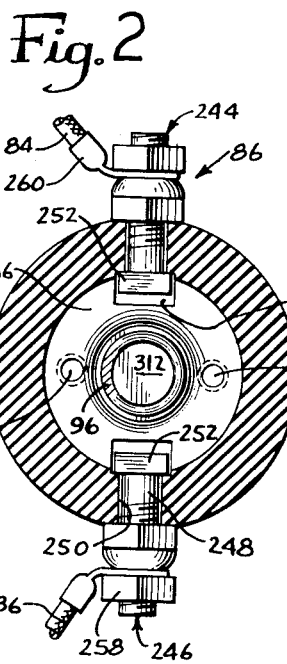
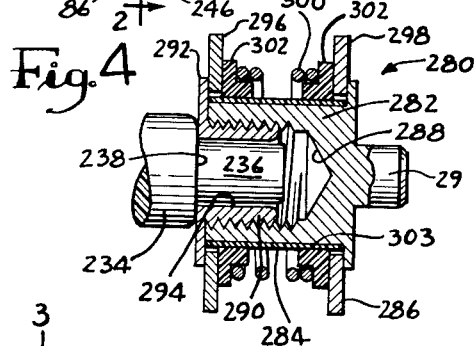
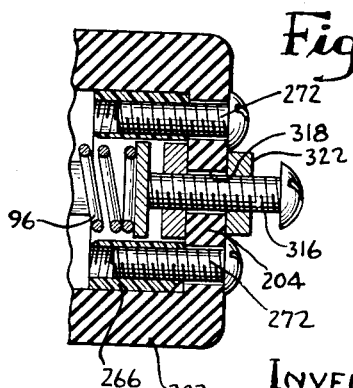
Aug. 15, 1961 — D. M. PUTNAM — 2,996,588
FLUID PRESSURE OPERATED ELECTRICAL SWITCH ASSEMBLY
Original Filed Dec. 5, 1958 — 3 Sheets-Sheet 1
INVENTOR
DONALD M. PUTNAM
ATTY.

INVENTOR
DONALD M. PUTNAM
by: [signature]
ATTY.

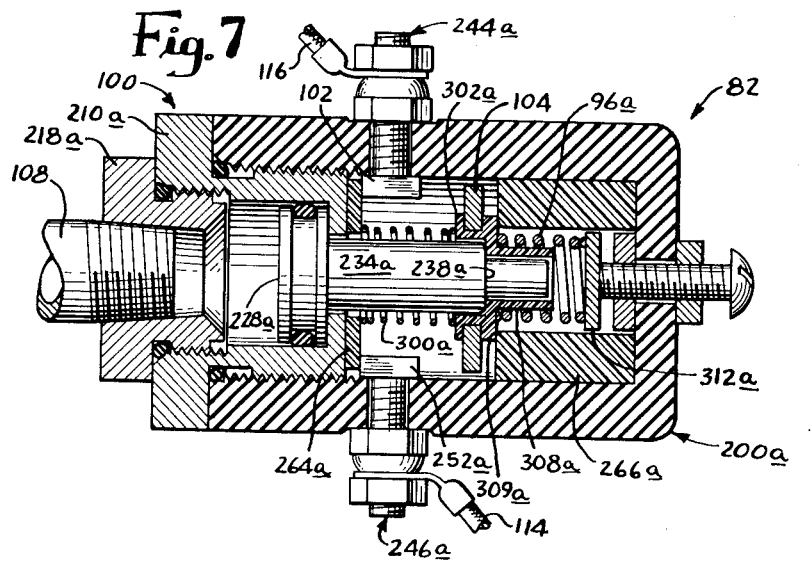
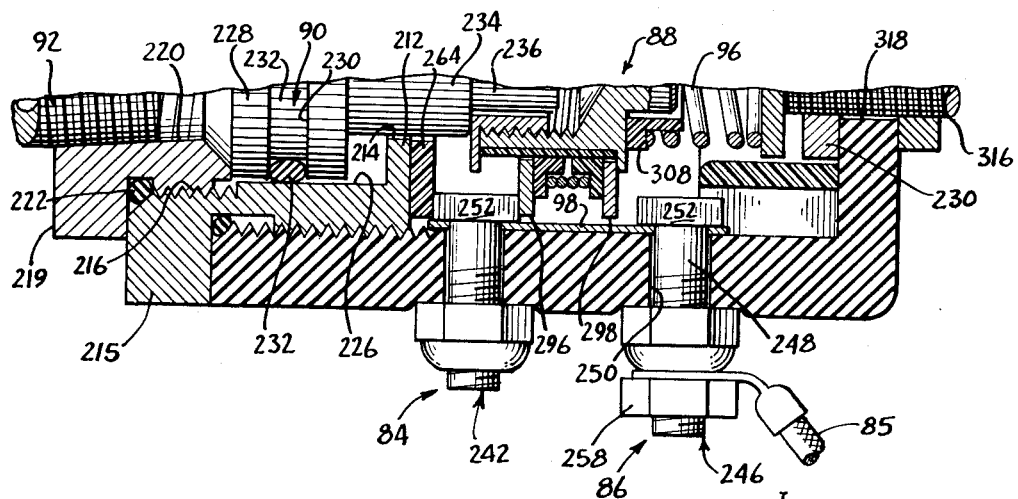

United States Patent Office 2,996,588
Patented Aug. 15, 1961

2,996,588
FLUID PRESSURE OPERATED ELECTRICAL SWITCH ASSEMBLY
Donald M. Putnam, Chicago, Ill., assignor to Power Brake Parts Mfg. Co., Chicago, Ill., a corporation of Illinois
Original application Dec. 5, 1958, Ser. No. 778,505. Divided and this application Feb. 11, 1960, Ser. No. 8,059
2 Claims. (Cl. 200—82)

The improved fluid pressure-operated switch assembly comprising the present invention has been designed for use primarily as an emergency stop-light control switch in connection with signalling systems for the braking apparatus associated with tractor-trailer combinations, for example, the signalling system shown and described in my co-pending application Serial No. 778,505, filed on December 5, 1958, now U.S. Patent No. 2,979,364, and entitled "Pneumatic Signalling System for Tractor-Trailer Combinations," of which application the present one is a division. When put to such use, the switch assembly is adapted to be actuated under the control of air pressure conditions in the braking system and to serve as a circuit making and breaking device for selectively energizing and deenergizing both normal and emergency signalling circuits associated with the tractor and trailer stop-light signal lamps.

The invention is by no means limited to such use and fluid pressure-operated electrical switch assemblies constructed in accordance with the principles of the present invention may, with suitable modification, or with no modification whatsoever, be employed for a wide variety of other uses under the control of either gas or liquid pressure, i.e., as a pneumatic or as a hydraulic switch, respectively. One such contemplated use is as an oil pressure switch in a signalling system for indicating when the pressure of lubricating oil in an internal combustion engine falls below a predetermined minimum pressure. The present switch assembly, in either of the two forms illustrated herein, is also useful in fields other than the automotive field. Irrespective, however, of the particular use to which the present invention may be put, the essential features thereof are at all times preserved.

The principal object of the invention is to provide a novel form of fluid pressure actuator switch assembly in the form of a compact composite circuit-making and breaking apparatus including two pairs of spaced electrical contacts, together with a shiftable contact-bridging member which is selectively operable between the two pairs of contacts to bridge the contacts of either pair, the assembly being operable under the control of the fluid pressure developed at a remote point in a fluid pressure system so that when the pressure at that point falls below a predetermined degree, the contacts of one pair will become bridged and when the pressure rises above such predetermined degree, the contacts of the other pair will become bridged.

Briefly, in carrying out this last mentioned object, the invention contemplates the provision of a generally cylindrical composite casing which is divided into two longitudinally spaced cylindrical chambers, one of the chambers constituting an operating cylinder for a piston and the other chamber constituting an operating chamber for the movable contact elements associated with the assembly. Suitably supported within the operating chamber at longitudinally spaced regions therealong are two pairs of spaced contacts and slidably disposed within the operating chamber between the two pairs of contacts is a spool-like contact bridging member which is selectively movable into and out of electrical engagement with the contacts of each pair. The bridge member is longitudinally expansible and contractible and is movable between a normal position wherein it is maintained, under the influence of spring pressure, in a contracted condition wherein it engages and electrically bridges the contacts of one pair while at the same time remaining out of bridging engagement with the contacts of the other pair, and an advanced position wherein it is compressed under the influence of high fluid pressure so that it engages and bridges the contacts of the other pair while at the same time remaining out of electrical contact with the contacts of the first pair. In an intermediate position between its normal and its advanced position, the bridge member is expanded or extended so that it engages and bridges the distance between the contacts of both pairs. The circuit making and breaking assembly of the present invention will thus be found useful in any electrical control system wherein it is desired to energize one electrical circuit prior to deenergizing of a second electrical circuit and to thereafter deenergize the second circuit while maintaining the first circuit energized. In other words, the assembly will be found useful in the control of electrical circuitry where two circuits are to be selectively opened and closed with an interval of time existing after the closure of one circuit and before the opening of the other circuit wherein both circuits remain closed.

The provision of circuit making and breaking apparatus such as has been briefly outlined above being among the principal objects of the invention, it is another object to provide such an apparatus wherein the bridging contact member associated with the same is self-aligning and self-compensating so that despite the fact that the contacts may become worn, the bridging member will at all times move into intimate electrical contact with the same.

Another object of the invention is to provide such an apparatus wherein the bridging member is opposed in one direction by spring pressure and is opposed in the other direction by fluid pressure, the spring pressure being regulable at will so that the device may be caused to operate at different predetermined fluid pressures to open or close the electrical circuits involved as desired.

A still further object of the invention is to provide an apparatus of this sort wherein the bridging member is maintained normally in its extended or expanded condition under the influence of spring pressure and wherein it is caused to be contracted under the influence of an overriding spring pressure, the springs involved in each case being electrically insulated or isolated from the electrical circuits involved so that these springs will not be subjected to ohmic resistance tending to alter their spring characteristics or to otherwise impair their efficiency as spring members.

Yet another object of the invention is to provide a structure of this sort wherein the fixed contact elements associated therewith are maintained in proper operative alignment for maximum effective contact area with the bridging member which operates between them.

The provision of a switch assembly which is of extremely compact design and which, therefore, occupies but little space; one in which the housing-contained parts thereof are completely enclosed and concealed; one which in self-draining so that it will not accumulate moisture when compressed air is employed for its actuation and which, therefore, will operate efficiently in subfreezing temperatures; one which is comprised of a minimum number of moving parts and which, therefore, is unlikely to get out of order; one which is rugged and durable and which, therefore, will withstand rough usage; one which is capable of ease of assembly and disassembly for purposes of inspection, repair, or replacement of parts, one which is capable of ready adjustment to vary the actuating characteristics of the circuit making and breaking elements without requiring disassembly of its constituent parts; and one which otherwise is well adapted to perform the services required of it, are further desirable features which have been borne in mind in the production and development of the present invention.

In the accompanying three sheets of drawings forming a part of this specification, two illustrative embodiments of a fluid pressure-operated switch assembly embodying the principles of the present invention have been shown.

In these drawings:

FIG. 1 is a sectional view taken substantially longitudinally and centrally through a circuit making and breaking apparatus or assembly constructed in accordance with the principles of the present invention and showing the same operatively applied to a fluid line under conditions of low fluid pressure;

FIG. 2 is a sectional view taken substantially along the line 2—2 of FIG. 1;

FIG. 3 is a sectional view taken substantially along the line 3—3 of FIG. 2;

FIG. 4 is an enlarged fragmentary sectional view of a portion of the structure shown in FIG. 1;

FIG. 7 is a fragmentary sectional view similar to FIG. 1 showing a modified form of circuit making and breaking apparatus; and FIG. 8 is a fragmentary sectional view of a portion of the structure shown in FIG. 1 showing, additionally, an internal electrical connection between a pair of adjacent contacts.

Figure 6:
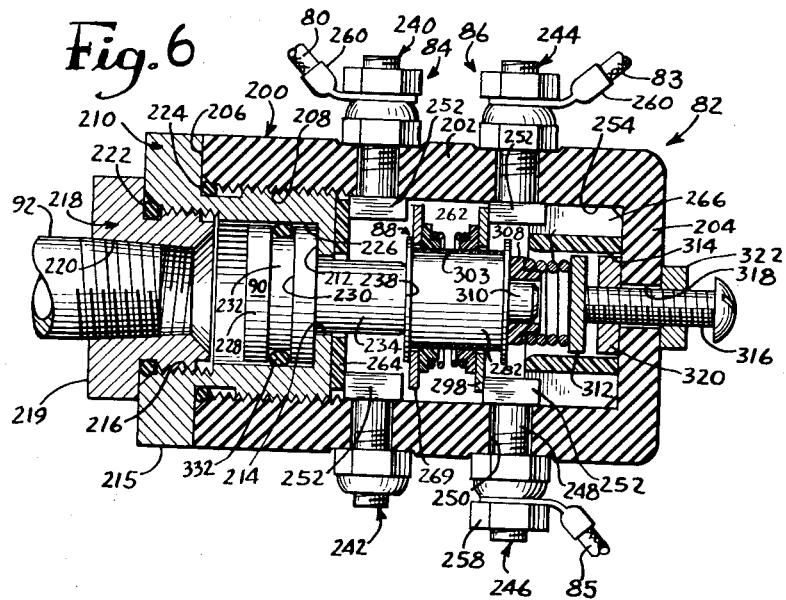
FIG. 6 is a sectional view similar to FIGS. 1 and 3 showing the parts in the positions which they assume under conditions of high fluid pressure.
Figure 5:
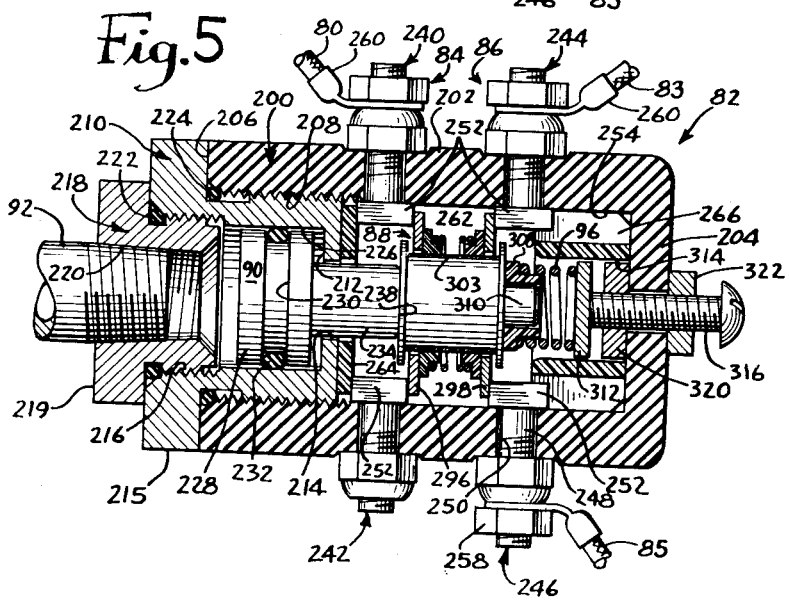
FIG. 5 is a sectional view similar to FIG. 1 showing the parts in the position which they assume under conditions of intermediate fluid pressure.

Referring now to the drawings in detail and in particular to FIGS. 1 to 6, inclusive, wherein one form of switch assembly 82 has been shown. Briefly, this switch assembly 82 is of the dual contact reversible bridge type wherein two pairs of fixed separated contacts 84 and 86, respectively, are adapted to be selectively bridged by a movable bridge member 88 disposed between them, the bridge member when moving in either direction between two extreme positions, serving to engage one of the pair of contacts before it disengages the other pair of contacts so that when the bridge member is in an intermediate position, both pairs of contacts are bridged. The bridge member 88 is operatively connected to a piston and cylinder device 90 having communication through a conduit section 92 with a source of actuating fluid subject to variations in internal fluid pressure. A spring 96 normally maintains the bridge member 88 in the position shown in FIG. 1, but when the fluid pressure within the conduit 92 exceeds a predetermined minimum, the spring pressure is opposed so that the bridge member 88 is moved through the position shown in FIG. 5, to the position shown in FIG. 6.

A connector strip 98 may be employed to establish communication between one of the pair of contacts 84 and one of the pair of contacts 86 as shown in FIG. 8. This connector strip 98 is employed to adapt the device 82 for use in the signalling system shown in my co-pending application Serial No. 778,505 above referred to. It will be understood, however, that the connector strip 98 ordinarily will be omitted when the circuit making and breaking apparatus is employed in certain other installations and it may be supplied separately by the manufacturer for installation by the consumer, if desired.

More specifically, the switch assembly 82 involves, in its general organization, a relatively deep, thick wall, outer switch casing 200 having a cylindrical wall 202, a circular end wall 204 and an open rim 206. The open end region of the casing 200 is interiorly threaded as at 208 for threaded reception therein of a generally cup-shaped cylinder unit 210 having a circular end wall 212 provided with a central opening 214 therethrough. The open end of the cylinder unit 210 is provided with a radial flange 215 which may be of hexagonal contour for reception thereover of a suitable tool such as a wrench, and the flange 215 is adapted to bear against the open rim 206 of the casing 200 when the cylinder unit 210 is in its home position within the unit. The open end of the cylinder unit 210 is interiorly threaded as at 216 for threaded reception therein of a nipple or fitting 218 having a hexagonal head portion 219 and provided with an internally threaded bore 220 for reception therein of one end of the conduit 92. A resilient O-ring 222 functions as a gasket for effecting a seal between the cylinder unit 210 and nipple 218 while a similar O-ring 224 functions as a gasket for effecting a seal between the casing 200 and the cylynder unit 210. The cylinder unit 210 is formed with an internal cylindrical bore 226 in which there is slidably disposed a piston 228 which is exteriorly grooved as at 230 for reception therein of a piston ring in the form of a resilient O-ring 232. The cylinder 228 is formed with a stem 234 having a reduced end 236 affording an annular shoulder 238. The stem 234 projects outwardly of the cylinder unit 210 through the opening 214 with a close fit, the piston and stem being slidable longitudinally of the valve casing 200 within the bore 226. The piston 228 and its stem 234 are preferably formed of a suitable insulating material, preferably of a plastic nature such as Bakelite or any one of a large number of available synthetic resins such as polyethylene or the like.

Projecting radially through the cylindrical wall 202 of the casing 200 are a series of four contact assemblies 240, 242, 244, and 246, respectively, the assemblies being arranged in diametrically disposed pairs. Each assembly is in the form of a bolt-like element having a threaded shank portion 248 projecting through an opening 250 in the wall 202 and a square head portion 252 which bears against the inner cylindrical surface 254 of the wall 202. A nut 256 is received on each shank 248 for securing the contact assembly in position on the wall 202 and a clamping nut 258 is provided for the purpose of maintaining the terminal ends 260 of a series of conductors in electrical engagement with the various contact assemblies. The heads 252 of the assemblies 240 and 242 assume diametrically opposed positions within the contact-enclosing chamber 262 and these two heads constitute, in effect, the previously mentioned pair of contacts 84. Similarly, the heads 252 of the assembly 244 and 246 are diametrically disposed across the chamber 262 and constitute, in effect, the previously mentioned pair of contacts 86. It is essential that the various contact assemblies 240, 242, 244 and 246 be secured in position on the wall 202 in such a manner that the square head portions 252 have their side edges extending longitudinally of the casing 200. Accordingly, a disc or washer 264, likewise formed of insulating material, surrounds the stem 234 and is adapted to have its extreme peripheral edge regions clamped between the end wall 212 of the cylindrical unit 210 and one flat side of each of the square heads 252 of the contact assemblies 240 and 242. In order to properly orient the square head portions 252 of the contact assemblies 244 and 246 with the side surfaces thereof extending longitudinally of the casing 200, a ring member 266 is nested within the deep end of the bore 254 and is formed with a pair of longitudinally extending peripheral slots 268 which embrace limited regions of the heads 252 as indicated at 270. The ring member 266 is formed of a suitable insulating plastic material and it is formed with a pair of diametrically opposed threaded bores 272 (FIG. 2) designed for threaded reception therein of a pair of anchoring screws 274 which project through the casing end wall 204 and serve to maintain the ring 266 seated and in face-to-face contact with the inside surface of the wall 204.

Mounted on the reduced end 230 of the piston stem 234 and movable longitudinally in opposite directions within the chamber 262, and operative between the two pairs of contacts 84 and 86 is the previously mentioned composite contact-bridging assembly 88 (shown in detail in FIG. 2) and including a core member 282 having a cylindrical spool surface 284 and a radial flange 286 at one end thereof. The core member 282 is provided with a threaded socket 288 in one end thereof in which there is threadedly received a cap member 290 provided with a radial flange 292. The cap member 290 is formed with a central bore 294 therethrough which receives therein the reduced end 236 of the piston stem 234. The cap member 290, when received on the reduced portion 236 of the stem 234, is adapted to bear against the shoulder 238. Slidably and floatingly disposed on the cylindrical portion 284 of the spool core 282 are a pair of contact bridging rings proper 296 and 298, respectively, these rings being disposed at opposite ends of the spool and being normally urged or spread apart by means of a compression spring 300 which is interposed between the rings and insulated therefrom by means of insulating washers 302 formed of a suitable plastic material. A sleeve 304 of insulating material insulates the rings 296 and 298 from the core 282. The ends of the spring 300 are seated within recesses 304 provided in the washers 302. The rings 296 and 298 are thus normally urged apart and into engagement with the respective flanges 292 and 286 of the spool assembly. The purpose of insulating the spring 300 from the contact bridging rings 296 and 298 is to maintain the spring free from the flow of any electric current therethrough which, due to the ohmic resistance of the spring, might tend to cause heating thereof with a consequent loss of spring tension.

In order to maintain the spool assembly 88 seated on the shoulder 238 provided at the base of the reduced cylindrical portion 236 of the piston stem 234, the compression spring 96 bears at one end against an insulating washer 308 which is telescopically received over a post 310 provided on the end of the spool body 282 adjacent the flange 286 (FIG. 4). The other end of the spring bears against an insulating disc 312 which is slidable within the central bore 314 provided in the ring member 266 and which is adapted to bear against the inner end of an adjusting screw 316 which passes through an opening 318 provided in the end wall 204 of the casing 200 and which also passes through and has threaded engagement with a circular nut 320 frictionally retained within the bore 314. A locking nut 322 serves to secure the adjusting screw 316 in any desired position of adjustment. The washer 308 and disc 312 serve to insulate the spring 306 from the electrical components of the switch assembly.

In order to adapt the above described switch assembly for use in certain installations as, for example, in the signalling system of my co-pending application Serial No. 778,505, above referred to, the previously described connector strip 98 underlies the square contact heads 252 of the contact assembly 242 and 246 and electrically connects these two assemblies as shown in FIG. 8. It will be understood that for certain installations where the assemblies 242 and 246 are to remain electrically insulated from each other, this connector strip 98 will be omitted, as shown in FIGS. 1 to 6, inclusive.

It is to be noted that in the normal or free condition of the various parts of the above described switch assembly 82, the compressional force applied by the spring 306 against the spool assembly 88 is sufficiently great as to overcome the compressional force exerted by the spring 96 so that the spool assembly as a whole is forced to the left as viewed in FIG. 1 and the contact ring 296 is maintained in electrical bridging engagement with the square contact heads 252 of the assemblies 240 and 242, respectively, while the contact bridging ring 298 is forced away from the flange 286 so that it remains out of contact with the square contact heads 252 of the assemblies 244 and 246. Thus, in the normal condition of the switch assembly 82, the contact assemblies 240 and 242 remain electrically connected together while the contact assemblies 244 and 246 are insulated from each other. Normally, the contact assemblies 244 and 246 also remain insulated from the contact assemblies 240 and 242, as shown in FIGS. 1 to 6, inclusive, but when the connector strip 98 is provided, the assemblies 246 and 242 are normally electrically connected together.

When the switch assembly 82 is operatively installed in a control system requiring the use of the connector strip 98 as shown in FIG. 8, and the fluid pressure within the conduit section 92 is below a predetermined minimum, the three contact assemblies 240, 242 and 246 will be electrically connected together while the contact assembly 244 will be insulated from the other contact assemblies. As the pressure rises within the conduit 92, the piston 228 will move forwardly in the bore 226 in the cylinder unit 210 and the shoulder 238 provided on the piston stem 234 will force the spool member or core 282 to the right as viewed in FIG. 1, thus causing the compression spring 300 to urge the ring 298 forwardly so that this ring will move bodily with the core member until such time as it engages the transverse sides of the square contact heads 252 associated with the assemblies 244 and 246. For a brief interval of time during the forward motion of the piston 228, the contact ring 298 will engage the contact assemblies 244 and 246, while, simultaneously, the contact ring 296 will engage the contact assembly 240 and 242. If the connector strip 98 is employed, all four of the contact elements 240, 242, 244 and 246 will be in electrical engagement at this point. If the connector strip 98 is not employed, the electrically connected contact assemblies 240 and 242 will remain insulated from the electrically connected assemblies 244 and 246. As the pressure within the conduit section 92 continues to rise above the predetermined minimum, the shoulder 238 will force the spool body 282 still further to the right as viewed in FIG. 1 so that the flange 298 on the spool body 282 will move away from the contact ring 298 while the flange 292 will move into engagement with the contact ring 296 and force the latter away from its bridging engagement with the contact assembly 240 and 242. Thus, when full line pressure has been attained within the conduit 92, the contact assemblies 244 and 246 will be electrically bridged while the contact assemblies 240 and 242 will be electrically isolated from each other. If the connector strip 96 is employed at full line pressure, the contact assembly 242, 244 and 246 will become electrically connected together.

To summarize the operation of the switch assembly 82, in the absence of the connector strip 96, at low line pressure, the contact assemblies 240 and 242 will be electrically connected together while the contact assemblies 244 and 246 will each be insulated from the remaining contact assemblies. At intermediate line pressure, the contact assemblies 240 and 242 will be electrically connected together as will also the contact assemblies 244 and 246, but this latter pair of contact assemblies will remain electrically insulated from the former pair of contact assemblies. At full line pressure, the contact assemblies 240 and 242 will remain electrically insulated from each other while the contact assemblies 244 and 246 will be electrically connected. If the connector strip 96 is employed, at low line pressure, the contact assemblies 240, 242 and 246 will be electrically connected together while the contact assembly 244 will be electrically isolated from the others. At intermediate line pressure, all four contact assemblies will be electrically connected together. At high line pressure, the contact assemblies 242, 244 and 246 will be electrically connected together while the contact assembly 240 will be electrically isolated from the others.

Referring now to FIG. 7 wherein a modified form of switch assembly 100 has been illustrated in detail, this assembly is similar in many respects to the previously described switch assembly 82 and in order to avoid needless repetition of description, identical reference numerals but bearing the suffix "a" have been applied on the parts in FIG. 7 which correspond to identical parts in FIG. 1. The switch housing 200a, the cylinder unit 210a, the piston 228a and its stem 234a and the nipple 218a remain substantially the same as in the previously described form of the invention. The casing 200a is provided with but one pair of opposed contact assemblies 240a and 242a, respectively, these assemblies being identical with the assemblies 240 and 242 and including square contact heads 252a In place of the composite spool-like contact bridge assembly 88, a single contact bridging ring 298a is employed. The bridging ring 298a is maintained insulated from the stem 236a by means of an insulating ring 302a through which the stem 236a passes. The shoulder 238a provided on the stem 236a bears against a sleeve 308a which is telescopically received on the reduced end 236a of the stem 234a and having a radial flange 309a which bears against one side of the contact ring 298a. A compression spring 300a bears at one end against the insulating washer 264a and at the other end against the insluating ring 302a and normally urges the bridging contact 298a to the right as viewed in FIG. 7. A spring 306a of greater compressional force than the spring 300a bears at one end against the flange 309a of the sleeve 308a and at its other end against the floating disc 312a so that the contact ring 298a is normally maintained in electrical contact with the two square contact heads 252a on the contact assemblies 244a and 246a, respectively. Otherwise, the details of the switch assembly 100 remain substantially the same as the details of the switch assembly 82.

In the operation of the switch assembly 100, when the pressure within the conduit section 92a remains below a predetermined minimum, the compressional force of the spring 306a overcomes the compressional force of the spring 300a so that the bridging contact ring 298a normally is in engagement with the contact assemblies 244a and 246a. When the pressure within the conduit section 92a exceeds the predetermined minimum, the piston 228a moves to the right as viewed in FIG. 7 and the shoulder 238a which bears against the end of the sleeve 308a serves to move the sleeve to the right, thus compressing the spring 306a and allowing the spring 300a to force the insulating ring 302a, and consequently, the bridging contact ring 298a, away from the contact assemblies 244a and 246a. As the pressure within the conduit section 92a decreases, a reverse operation takes place and the contact ring 298a is restored to its normal position of engagement with the square contact heads 252a on the assemblies 244a and 246a. It is to be noted that both of the springs 300a and 306a are electrically insulated from the electrical components of the switch assembly so that they are not subjected to the flow of current therethrough, which, due to the ohmic resistance of these springs, might otherwise cause them to became heated to such an extent that the resiliency of the springs would be destroyed.

It is to be noted that in connection with both the switch assemblies 82 and 100 described above, the various contact bridging members are self-aligning and self-compensating for wear. Due to the relatively heavy flow of current through the contact assemblies when the switch assemblies are employed in signalling systems such as that illustrated in FIG. 7 repetitive arcing at the various contacts may in time cause an appreciable amount of contact deterioration so that the contacts become "worn." Despite this, the contact rings 296, 298 and 298a are self-aligning against the square contact heads 252 and 252a due to the fact that an appreciable clearance is provided at the central opening provided in these contact rings. Although one contact head 252 may become worn faster than a counterpart contact head, cocking of the various contact rings employed in connection with the present invention as a consequence of such uneven wear will not destroy the effective contact between the contact rings and the various contact heads with which they are associated.

The invention is not to be limited to the exact arrangement of parts shown in the accompanying drawings or described in this specification since various changes in the details of construction may be resorted to without departing from the spirit of the invention. Only insofar as the invention has particularly been pointed out in the accompanying claims is the same to be limited.

Having thus described the invention what I claim as new and desire to secure by Letters Patent is:

1. Pneumatic circuit making and breaking apparatus in the form of a switch assembly including a generally cylindrical relatively deep cup-shaped casing formed of insulating material and having a cylindrical side wall and an end wall closing one end of the casing, the other end of the casing being open, means defining a transverse partition wall within the casing and dividing the same into a forwardly disposed switch chamber and a rearwardly disposed piston chamber a piston slidable in said piston chamber and having a plunger stem thereon projecting through said partition wall and into said switch chamber, first and second pairs of contact assemblies respectively mounted on said casing, each contact assembly including a bolt having a threaded shank extending through the cylindrical side wall of the casing and provided with a square head within the casing and constituting a contact element proper, the shank of the bolt constituting a binding post exteriorly of the casing, the contact elements of each pair of contact assemblies being disposed in respective common planes with the contacts of the respective assemblies being longitudinally spaced along the casing, means on said plunger stem defining a pair of opposed spaced shoulders which are movable bodily with the plunger stem, a contact bridging assembly floatingly mounted on said plunger stem between said shoulders, said assembly including a pair of spaced contact rings surrounding the stem and independently slidable longitudinally therealong, a compression spring surrounding the plunger and interposed between said contact rings and serving to normally urge the same against said shoulders, the overall longitudinal extent of said contact rings, when in engagement with said shoulders, being greater than the distance between the respective planes of the contact elements of said pairs of contact assemblies, said piston and plunger stem being movable from a retracted position wherein one of said contact rings is out of contact with its respective shoulder on the plunger stem and is pressed against the contact elements of said first pair of contact assemblies under the influence of said spring, and the other contact ring is in engagement with its respective shoulder on the plunger stem, through an intermediate position wherein said contact rings are urged against the contact elements of the first and second pairs of contact assemblies respectively under the spreading action of said spring, to an advanced position wherein said other contact ring is out of contact with its respective shoulder on the plunger stem and is compressed against the contact elements of said second pair of contact assemblies under the influence of said spring, and said one contact ring is in engagement with its respective shoulder on the plunger stem, a retaining ring formed of an insulating material and disposed within the casing and seated against said end wall, means fixedly securing said retaining ring to said end wall, said retaining ring being formed with a pair of longitudinally extending grooves therein in the peripheral regions thereof, the square heads of the bolts which comprise the contact elements proper of the second pair of contact assemblies extending into said grooves respectively and being confined therein against turning movement, means normally urging said piston and plunger stem toward their retracted position, and means defining a fluid port for said piston chamber on the side thereof rearwardly of the piston.

2. Pneumatic circuit making and breaking apparatus as set forth in claim 1 wherein said means for normally urging said piston and plunger stem toward their retracted position comprises an adjusting screw threadedly received through said end wall, said retaining ring having a central opening therein into which the inner end of said adjusting screw extends, a compression spring having one end thereof bearing against said plunger stem and having its other end projecting into the central opening in said retaining ring, a floating disk interposed between said other end of the spring and said adjusting screw, and a lock nut for said adjusting screw.

References Cited in the file of this patent
UNITED STATES PATENTS

| | | |
|---|---|---|
| Re. 23,340 | Lincoln | Feb. 13, 1951 |
| 2,747,034 | Machon et al. | May 22, 1956 |